United States Patent
Rajsic et al.

(10) Patent No.: US 7,366,184 B2
(45) Date of Patent: Apr. 29, 2008

(54) SVC/SPVC WITH L3 IP FORWARDING

(75) Inventors: Carl Rajsic, Nepean (CA); Arnold Jansen, Ottawa (CA); Mudashiru Busari, Ottawa (CA)

(73) Assignee: Alcatel, Paris (FR)

( * ) Notice: Subject to any disclaimer, the term of this patent is extended or adjusted under 35 U.S.C. 154(b) by 951 days.

(21) Appl. No.: 10/417,116

(22) Filed: Apr. 17, 2003

(65) Prior Publication Data

US 2004/0208191 A1    Oct. 21, 2004

(51) Int. Cl.
 *H04L 12/56* (2006.01)
(52) U.S. Cl. .............. 370/396; 370/395.2; 370/395.52; 370/410; 709/220
(58) Field of Classification Search ............. 370/395.5, 370/395.52
See application file for complete search history.

(56) References Cited

U.S. PATENT DOCUMENTS

| | | | | |
|---|---|---|---|---|
| 6,421,321 | B1* | 7/2002 | Sakagawa et al. | 370/238.1 |
| 6,452,921 | B1* | 9/2002 | Alexander et al. | 370/351 |
| 6,606,321 | B1* | 8/2003 | Natanson et al. | 370/395.2 |
| 6,658,001 | B1* | 12/2003 | Furuno et al. | 370/392 |
| 6,671,279 | B1* | 12/2003 | Mangin et al. | 370/395.5 |
| 6,781,994 | B1* | 8/2004 | Nogami et al. | 370/395.1 |
| 6,804,247 | B1* | 10/2004 | Sasyan et al. | 370/397 |
| 7,058,027 | B1* | 6/2006 | Alessi et al. | 370/310.1 |
| 7,151,770 | B1* | 12/2006 | Clark | 370/352 |
| 2001/0005381 | A1* | 6/2001 | Sugiyama | 370/466 |
| 2004/0085968 | A1* | 5/2004 | Chen et al. | 370/397 |

FOREIGN PATENT DOCUMENTS

WO    WO 00/30401    5/2000

OTHER PUBLICATIONS

Downey: "Overview of Tag Switching", Electronics Industries Forum of New England, 1997. Professional Program Proceedings Boston, MA, May 6-8, 1997, New York, USA, IEEE, pp. 61-66.
Rekhter et al: "Tag Switching Architecture—Overview, draft-rekhter-tagswitch-arch-00.txt" Internet Draft, Jan. 1997, pp. 1-20.

* cited by examiner

*Primary Examiner*—Wing Chan
*Assistant Examiner*—Brian Roberts
(74) *Attorney, Agent, or Firm*—Jim Zegeer

(57) ABSTRACT

In a multi-service network, layer 2 traffic such as IP traffic according to the invention is carried over ATM SVCs or SPVCs. Methods of setting up such connections using the PNNI protocol are also discussed. Using enhancements to the standard ATM SPVC/SVC signaling messages, layer 3 IP routing processes on multi-services switches on opposite ends of the network allow traffic to flow transparently through an underlying layer 2 virtual connection. This provides a simple and efficient way to transport IP packets across an ATM network.

20 Claims, 2 Drawing Sheets

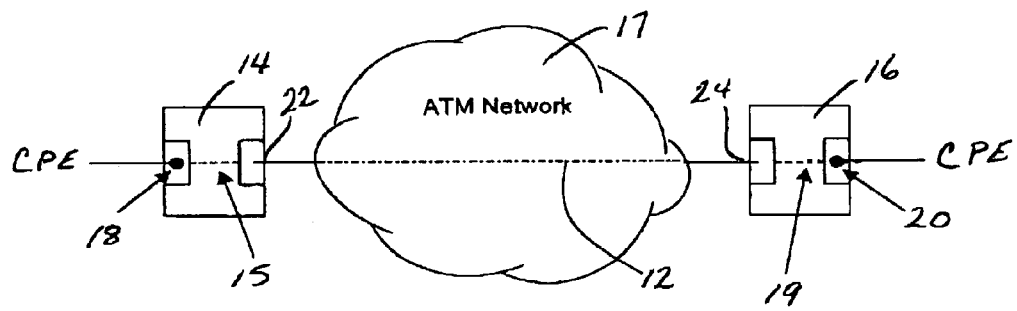
Figure 1 Prior Art
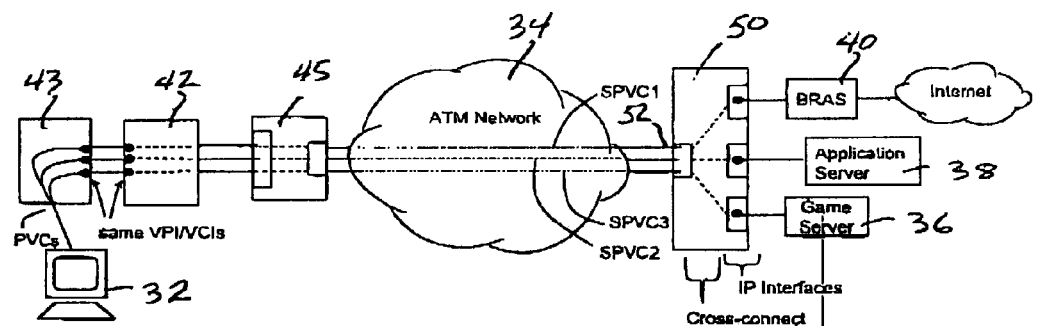
Figure 2 Prior Art: DSL Service Application
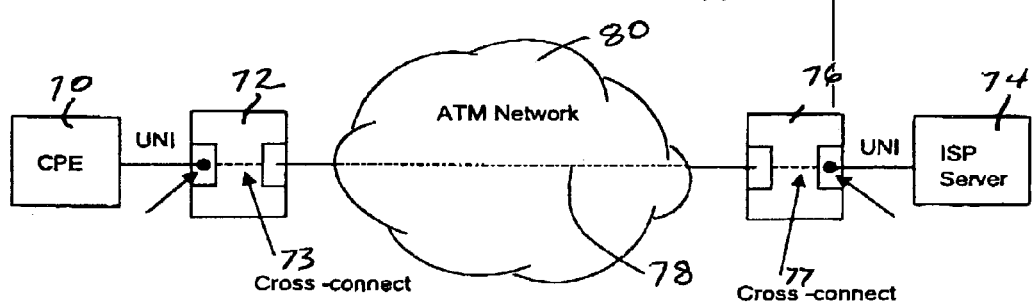
Figure 3 Prior Art: SVC Application

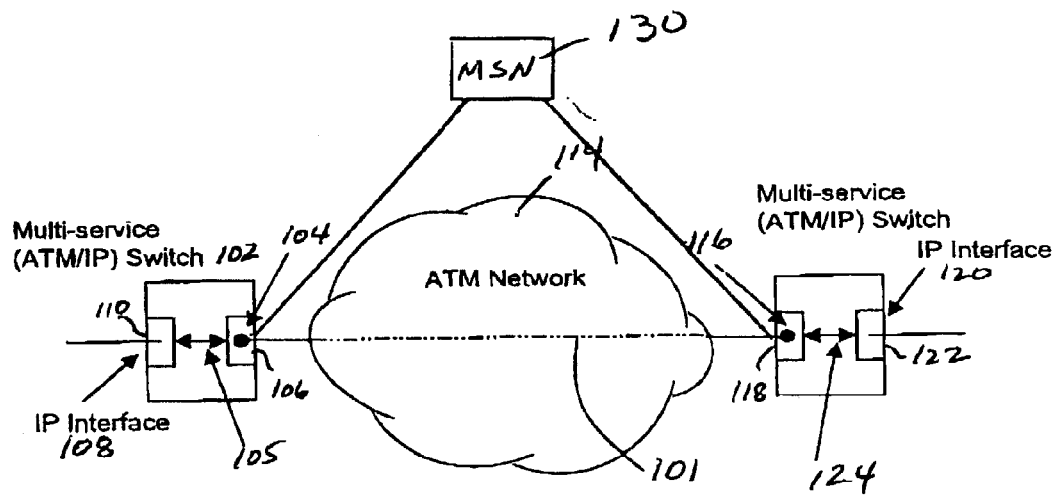
Figure 4: L3-SPVC
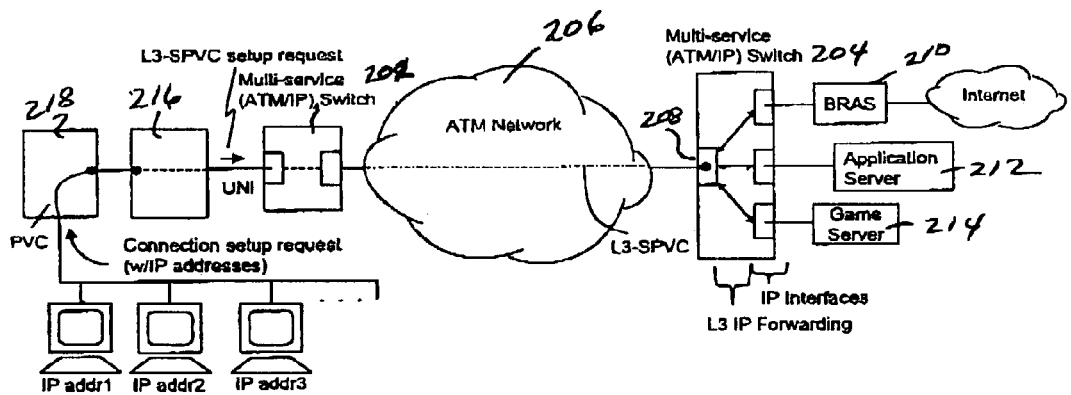
Figure 5: L3-SPVC in DSL Application

SVC/SPVC WITH L3 IP FORWARDING

FIELD OF THE INVENTION

This invention relates to digital communications utilizing multi-service switching architectures and more particularly to systems and methods of carrying layer-3 IP traffic over SVCs or SPVCs and to setting up these connections using ATM signaling protocols.

BACKGROUND

Prior art switching architectures in digital communications networks typically employ data link (layer-2) services. ATM packet switching technology uses virtual connections for completing end to end communications through the ATM network. Virtual connection types include permanent virtual connections (PVC), switched virtual connection (SVC) or soft permanent virtual connection (SPVC). SVCs transport packets through the network and each packet contains routing and addressing information. These packets pass through the network sharing certain paths with packets from other messages. Permanent virtual circuits are ones in which terminals are permanently associated via a virtual circuit. An SPVC employs PVC type connections from the edge of the network to end users and SVC type switching within the network.

FIG. 1 shows an SPVC 12 that allows user traffic to flow between two ATM switches 14 and 16 through an ATM network 17, according to the prior art. The SPVC 12 has two endpoints 18 and 20 (each shown as a black dot in the figure) at the edges of the network. Each SPVC endpoint terminates on a port that provides direct connectivity to the CPE from their respective ATM switches. From the source node's perspective, (switch 14), the endpoint 18 is cross-connected 15 internally to the egress port 22 in which the SPVC 12 leaves the node. From the destination node's perspective (switch 16), the endpoint 20 is cross-connected 19 internally to the ingress port 24 in which the SPVC 12 call entered the node. The remainder of the SPVC 12 is shown as a dashed line through the ATM network cloud 17. SPVCs are setup between ATM switches using ATM signaling protocols such as the PNNI (private network-network interface) protocol.

FIG. 2 depicts an example DSL (digital subscriber line) application according to the prior art. In this example, an end user's computer 32 is connected via ATM switch 45, an ATM network 34, and associated equipment to three separate IP services. These separate services are network games provided by a game server 36, video on demand provided through an application server 38, and internet access provided through a broadband remote access server (BRAS) 40. A dedicated SPVC connection (SPVC1, SPVC2, and SPVC3) exists for each of these services. Each SPVC connection has an endpoint at the ingress port of a DSL access multiplexer (DSLAM) 42 and another endpoint at an IP interface of a far-end ATM switch 50. In the far-end ATM switch 50, each SPVC has an internal cross-connect that connects its associated IP interface to an ingress port 52 of the switch. The user's computer 32 is connected to the DSLAM 42 via a CPE modem 43. For each SPVC, there is a PVC connection between the user's computer and an egress port on the CPE modem. Each corresponding SPVC and PVC pair share the same VPI/VCI (virtual path identifier/virtual circuit identifier) to make a connection between the CPE modem and the DSLAM.

FIG. 3 depicts a prior art SVC application that is substantially the same as that of FIG. 1, wherein a SPVC is used. The connection would originate from the CPE 70 connected to switch 72 and terminate on the ISP Server 74 connected to switch 76. The SVC 78 is shown as a dotted line through ATM network 80. Switches 72 and 76 have internal cross connects 73 and 77 respectively.

A problem with the prior art, particularly with regard to the example application shown in FIG. 2, is that it leads to a large number of PVC and SPVC connections. The PVC and SPVC resources have limitations; hence it is desirable to use these resources as efficiently as possible. In fact, experience has been that reaching PVC limitations in CPE modems has been a problem. Moreover, as the number of users and the services that they subscribe to grow to a very large number in such applications, the SPVC limitations in network nodes will become an issue. Furthermore, in the interest of setting up and maintaining connections, e.g. in response to network failures, it is desirable to minimize the total number of connections by using existing connections efficiently.

Another problem with the prior art as shown in FIG. 3 is that SVCs only provide connectivity to a single connection between CPE devices. If multiple services are required from different CPE equipment (possibly with different IP addresses) on the same node, then multiple SVCs are required from the source CPE, when a single SVC could suffice.

SUMMARY OF THE INVENTION

This invention describes a new approach to carry layer-3 traffic (e.g. IP traffic) over an ATM network cloud using an ATM signaling protocol such as the PNNI protocol and enhancing SVC or SPVC signaling messages to dynamically establish a virtual IP link through the ATM network. Other ATM signalling protocols include AINI, UNI and IISP.

In accordance with a first aspect of the present invention there is provided a method of establishing a connection in communication system, the system having a first end point with layer-3 forwarding capabilities in a first multi service network node, the method comprising the steps of:

a) establishing a second endpoint in the system, the second endpoint having a second multi service network node;

b) establishing a connection through any intervening network nodes between the first multi service network node and the second multi service network node;

whereby the first end point is assigned address information the address information being added to forwarding information in the first multi service network node.

BRIEF DESCPTION OF THE DRAWINGS

The invention will now be described in greater detail with reference to the attached drawings wherein;

FIG. 1 illustrates a prior art ATM network carrying SPVC connections;

FIG. 2 illustrates a prior art DSL service application;

FIG. 3 illustrates a prior art SVC application;

FIG. 4 illustrates a layer-3 SPVC application according to the present invention; and FIG. 5 illustrates a layer-3 SPVC in a DSL application according to the present invention.

DETAILED DESCRIPTION OF THE INVENTION

The goal of the invention is to establish connectivity between the independent routing processes running on switches at the source and destination of a network such as to allow direct exchange of routing information between them and establish reachability between subnets associated therewith. Most importantly, the connectivity is to be provided across the underlying L2 ATM network and in a transparent manner such that by the time the connectivity is established, the switches would assume each other as a next-hop router, regardless of the number of intermediate ATM switches along the path of the L2 virtual connection.

The invention introduces some enhancements to the standard ATM SPVC/SVC signaling messages (hereby referred to as L3-SPVC signaling or L3-SVC as the case may be) such that a L3 IP routing process on a second multi-service switch can establish a peer relationship with another L3 IP routing process on a second multi-service switch and exchange routing information as well as allow flow, transparently, through an underlying Layer 2 virtual connection. To the routing processes on both switches, the endpoints of the virtual connection (hereby referred to as L3-SPVC endpoints) are treated like another IP interface (a virtual IP interface) through which IP flows can occur.

The ability to establish a peering relationships through an underlying ATM network creates a number of applicability scenarios for this invention. Some of them are:

1. In a public context, to allow a subnet to connect to a public network providing public services, e.g., Internet access.
2. In a private context, to allow a subnet to join a virtual private network (VPN) and enable it to communicate with a second subnet included in the VPN.
3. In a semi-private context, to provide reachability between a subnet included in VPN and a second subnet included in a second VPN (i.e., an extranet).

As in normal IP routing contexts, establishment of peering relationship between the routing processes on the switches will require that they see the L3-SPVC endpoints as another IP interface configured with appropriate IP addresses such that each endpoint assumes the other is a next-hop interface. The routing processes on both switches would then exchange routing information through that (virtual IP) interface. To establish the connectivity required between these two virtual IP interfaces at both ends (through a L2 VC), a network management system can be used to configure either of the L3-SPVC endpoints to initiate the signaling process. The L3-SPVC signaling message will require certain extension (or addition) to the information elements (IE) carried in standard SPVC signaling messages. So, the required extensions to the standard SPVC messages and the way those messages are handled at both ends of the L3-SPVC connection represent key aspects of the present invention.

The additional IEs required in associated L3-SPVC signaling messages can include any combination of the following:

IP address of the virtual IP interface on the originating side
IP address of the virtual IP interface on the terminating side
L3-SPVC endpoint identifier on the originating node
L3-SPVC endpoint identifier on the terminating node
Routing process id on the originating node
Routing process id on the terminating node
Other statically configured IP address information Other optional IEs that may be included in signaling messages exchanged during the setup of the L3-SPVC includes but not limited to:

VPN addresses
Credential information for authentication and authorization
Parameters for negotiating IP routing protocols and policies
Reachability information
Forwarding table identifiers It should be noted that the specific implementation details of the L3-SPVC signaling process will determine what information is available to each multi-service switch from a management station 130 as shown in FIG. 4 and what combination of additional messages will need to be exchanged during the signaling process. For instance, a particular implementation scenario could pre-configure both endpoints of the L3-SPVC with their appropriate IP addresses and then have one end of the L3-SPVC endpoints initiate the signaling, including only the originating virtual IP interface's IP address and the destination virtual IP interface's IP address in the setup message. On the terminating node's side, establishment of the L3-SPVC would then require a mapping of the SPVC endpoint to the appropriate virtual IP interface, thus creating an end-to-end virtual IP link through the underlying VC for exchange of IP packets.

Any combination of the additional IEs suggested above are in addition to the standard IEs normally carried in SPVC signaling messages such as L2 resource characteristics for the connection such as service category (CBR, rtVBR, nrtVBR, UBR, or ABR), bandwidth, delay, jitter, cell loss ratio, etc.

It is also assumed that the implementation of the routing processes allows for configuration of routing policies such as security policies (e.g., access control lists) which determines which flow from which network should be mapped to a given L3-SPVC connection. An implicit feature normally supported in routing is the ability to be able to multiplex flows entering through different interfaces onto the same outgoing interface and the ability to also be able to de-multiplex such an aggregated flow from an incoming interface onto different outgoing interfaces. Treating the L3-SPVC endpoints as virtual IP interfaces fully supports such routing policies: 1-1 mapping, 1-N mapping, N-1 mapping, and N-N mapping. In addition, L3-SPVC provides additional benefits such as guaranteed QoS, transparent automatic reroute capability with no impact on the forwarding table, and the ability to be able to modify, on the fly, resources allocated at the ATM layer.

FIG. 4 shows a new type of ATM connection in accordance with the present invention. The type of connection is hereinafter referred to as an L3-SPVC (or L3-SVC as the case may be). This type of connection makes use of the multi-service, specifically ATM/IP, capabilities of multi-service switching/routing platforms. The connection is distinguished from a conventional SPVC connection in that at least one of its endpoints is what is referred to herein as an L3-forwarding endpoint. Such an endpoint is characterized by its location, of being at an ingress port of the "destination" multi-service switch (or being at the egress port of the "sourcing" multi-service switch), by its having an assigned or signaled IP address or addresses, and by its use of L3 IP forwarding to route IP packets between its ingress port and IP interfaces at other egress ports of that switch. FIG. 4 shows an L3-SPVC connection 101 that connects two multi-service switches via an ATM network 114. The connection in the figure has two L3-forwarding endpoints. In FIG. 4 multi-service switch 102 has SPVC endpoint 104 at the egress port 106 and IP interface 108 at ingress port 110. In FIG. 4 reference numeral 105 represents the ability to forward IP packets across the multi-service switch fabric from IP interface 108 to endpoint 104 and vice-versa. In fact, there may be multiple such IP interfaces 108 that can forward packets through the multi-service switching fabric towards the L3 endpoint 104 and vice versa. Similarly multi-service switch 112 at the opposite side of ATM network 114 has SPVC endpoint 116 at the ingress port 118 and IP interface 120 at egress port 122. Reference numeral 124 of FIG. 4 also represents the ability to forward IP packets across the multi service switch 112. It is to be understood that in a further embodiment of the invention either switch 102 or switch 112 has the L3 IP forwarding feature and the other does not.

FIG. 5 depicts the same concept as depicted in FIG. 2 as an example application of a possible DSL service. In this case, however, a L3-SPVC connection is used instead. The L3-SPVC replaces the dedicated SPVC to each IP interface in the former example; thereby reducing the number of connections in the network and on the switch. The L3-SPVC is used to carry the combined traffic for the IP services and therefore the connection resources of the network and switch are used more efficiently.

As shown in FIG. 5 the L3-SPVC in a DSL application has multi-service switches 202 and 204 at opposite ends of ATM network 206. In FIG. 5 only switch 204 is provided with L3 IP forwarding while it is to be understood that both switches can have this feature. Also FIG. 5 shows a L3-3PVC connection although the application could also have a L3 SVC connection. The L3 IP forwarding feature allows SPVC endpoint 208 to communicate independently with separate applications 210, 212, 214 via IP interfaces. At the user end, switch 202 is connected to multiple work stations via DSLAM 216 and CPE modem 218. The several computers on a LAN are connected via the L3-SPVC to the IP services. The L3-SPVC setup request will therefore include the IP addresses of the computers, and the IP forwarding table at the far-end ATM switch will be updated with these addresses when the L3-SPVC connection is made.

The L3-SPVC connection can be established in two ways:
1) by configuring the L3-SPVC endpoints on the destination and/or source switches with appropriate IP addressing information, or
2) by setting up the L3-SPVC in response to a new type of connection request, an L3-SPVC setup request, which contains the IP addressing information of the user's computer or other devices. In the case that the IP address information is dynamically assigned, the L3-SPVC setup request could be initiated containing the dynamically configured information. If an L3-SPVC connection already exists, yet IP addressing information is altered, then this information could be signaled in a connection modify request to the destination node so that L3 forwarding information is modified without tearing down the connection.

The following summarize the different types of messages supported by L3-SPVC (SVC) as illustrated by this invention.

Setup—This message is sent during the initial setup of the L3-SPVC. This message type is also supported by the standard SPVC setup message except for the additional IEs required to configure this type of connection.

Connect—This message is used for notification of successful allocation for the L3-SPVC resources along the setup path. This is also supported by the standard SPVC message except for additional IEs if needed.

Reachability—This message is used to advertise reachability. This is a new signaling message as defined by this invention.
  Inclusion—A reachability message indicating currently reachable networks. In addition, a newly added network (or interface) whose traffic is being aggregated onto an already existing L3-SPVC can necessitate sending a reachability message to include it in the forwarding table at the opposite end of the L3-SPVC.
  Withdrawal—A reachability message indicating networks that are no longer reachable and that should be withdrawn from the forwarding table. A L3-SPVC can automatically be torn down if the associated forwarding table has no reachable network in it for a given period of time to conserve network resources.
  This type of message could also be used to carry BGP, OSPF or ISIS routing information if desired.

Modify—This type of message is used to request for modification of resources already allocated for a given L3-SPVC. The modify message type can indicate increase or decrease depending on whether new users are being added or being withdrawn.

There are many other applications in which L3-SPVC and L3-SVC could be used, for example in connections between nodes in the core of a network, to provide dedicated IP tunnels within the ATM network. This concept is similar to MPLS LSPs (label switched paths) in networks that have MPLS implemented in the core.

In general, the invention provides a tool to allow a multi-service switch to provide L3 IP forwarding capabilities across L2 SPVC and SVC connections.

The invention provides a simpler way to transport IP packets across an ATM network.

The invention provides more efficient use of connection resources in the network and in CPE equipment such as DSL modems. This makes provisioning easier, improves scalability, and makes service applications less susceptible to connection resource constraints.

The invention provides the ability to alter L3 IP forwarding information in connections without requiring the connections to be torn down and re-established.

The invention provides a competitive alternative to other technologies that require QoS because of the inherent QOS features and abilities currently available using ATM connections in networks that exist today.

With a small change to current signaling specifications to handle L3-SVC and L3-SPVC signaling information, SVC and SPVC connections can be enhanced to provide a multi-service switch with the ability to forward IP packets over a VC including all the benefits of using SVCs or SPVCs. This manner provides excellent QOS for IP information flows. Since the QoS concerns associated with IP are currently receiving widespread attention, an alternative solution that solves these problems could have widespread interest and applicability.

Although specific embodiments of the invention have been described and illustrated it will be apparent to one skilled in the art that numerous changes can be made without departing from the basic concept of the invention. It is to be understood, however, that such changes will fall within the full scope of the invention as defined by the appended claims.

The invention claimed is:

1. A method of establishing an L-3 virtual circuit between routing processes on a first and respectively second multi-service network node in a communication system, comprising the steps of:

a) configuring a first endpoint on said first node for enabling a user connected to an ingress IP interface at said first node to request access to a service available at said second node;

b) automatically establishing from said first endpoint, a second L-3 endpoint at an ingress port of said second node for enabling L-3 IP forwarding between said second L-3 endpoint and an egress IP interface at an egress port on said second node;

c) automatically establishing said L-3 virtual circuit between said first and second endpoints over any intervening network node in said communication system for carrying L-3 traffic between the user and a service available at said egress IP interface, wherein said second L-3 endpoint is assigned a second IP address, and said second IP address is added to an IP forwarding table at the second node.

2. A method as claimed in claim 1, further comprising step d) of establishing said first endpoint as a first L-3 endpoint at an egress port of said first node for enabling L-3 IP forwarding between said ingress IP interface and said first L-3 endpoint, and wherein said first L-3 endpoint is assigned a second IP address, and the second IP address is added to an IP forwarding table at the first node.

3. A method as claimed in claim 2, wherein said L-3 virtual circuit carries Layer-3 traffic between a first sub-network connected to said ingress IP interface, and a second sub-network connected to said egress IP interface.

4. A method as claimed in claim 2, wherein said L3 endpoint and said L3 virtual circuit are established using a plurality of further signaling messages for enabling exchange of routing information between said routing processes on the first and second nodes, each said signaling message carrying an additional information element (IE) in addition to the standard IE carried by a standard SPVC message.

5. A method as claimed in claim 4, wherein the additional IE comprises any combination of the following data: the IP address of the egress IP interface, an identifier for said second L3-SPVC endpoint; an identification of the routing process on the second node; the IP address of the ingress IP interface; an L3-SPVC endpoint identifier on the first node and an identification of the routing process on the first node.

6. A method as claimed in claim 1, wherein the user is a client of a sub-network connected to said first node over said ingress IP interface, and said service includes Internet access available at said second node.

7. A method as claimed in claim 1, wherein the user is a client of a sub-network connected to said first node over said ingress IP interface, and said service includes one or more applications available at an application server connected to the egress IP interface at said second node.

8. A method as claimed in claim 1, wherein said L3 endpoint and said L3 virtual circuit are established using a plurality of further signaling messages for enabling exchange of routing information between said routing processes on the first and second nodes.

9. A method as claimed in claim 8, wherein said virtual circuit is one of a L3-SPVC and a L3-SVC.

10. A method as claimed in claim 6, wherein each said signaling message carries an additional information element (IE) in addition to the standard IE carried by a standard SPVC message.

11. A method as claimed in claim 10, wherein the additional IE comprises any combination of the following data: the IP address of the egress IP interface, an identifier for said second L3-SPVC endpoint; an identification of the routing process on the second node.

12. A method as claimed in claim 8, wherein each signaling message further includes an optional IE.

13. A method as claimed in claim 12, wherein a wherein the optional IE comprises any combination of the following data: a VPN addresses, credential information for authentication and authorization, parameters for negotiating IP routing protocols and policies, reachability information and forwarding table identifiers.

14. A method as claimed in claim 8, wherein said signaling messages include at least a setup message, a connect message, a reachability message, an inclusion message, a withdrawal message and a modify message.

15. A method as claimed in claim 14 wherein said additional IEs carried by said setup message includes data needed to configure said L3-virtual connection.

16. A method as claimed in claim 14, wherein said connect message notifies the intervening network nodes of the allocation of L3 resources to said L3 virtual circuit.

17. A method as claimed in claim 14, wherein said reachability message advertises reachability of nodes along said L3 virtual connection, providing information about sub-networks currently reachable from said first and second nodes.

18. A method as claimed in claim 14 wherein, when a further sub-network or interface is added at said second multi-service network node, said reachability message advertises reachability of said further sub-network, for enabling traffic from said further sub-network to be aggregated onto said L3 virtual connection, by including the IP address of said further sub-network or IP interface in the forwarding table at said second node.

19. A method as claimed in claim 14, wherein said reachability message advertises sub-networks that are no longer reachable, for enabling withdrawal of the IP address of said sub-networks that are no longer reachable from the forwarding table.

20. A method as claimed in claim 14, wherein said modify message requests modification of L-3 resources already allocated to said L3 virtual circuit.

* * * * *